United States Patent
Lin (10) Patent No.: US 12,298,477 B2
(45) Date of Patent: May 13, 2025

(54) OPTICAL LENS

(71) Applicant: Rays Optics Inc., Hukou Township, Hsinchu Township (TW)

(72) Inventor: Ying-Hsiu Lin, Hukou Township, Hsinchu County (TW)

(73) Assignee: YOUNG OPTICS INC., Hsinchu (TW)

( * ) Notice: Subject to any disclaimer, the term of this patent is extended or adjusted under 35 U.S.C. 154(b) by 865 days.

(21) Appl. No.: 17/238,947

(22) Filed: Apr. 23, 2021

(65) Prior Publication Data

US 2021/0373286 A1    Dec. 2, 2021

(30) Foreign Application Priority Data

May 29, 2020  (TW) ................................ 109118104

(51) Int. Cl.
  *G02B 13/00*   (2006.01)
  *G02B 9/34*    (2006.01)
  *G02B 9/62*    (2006.01)

(52) U.S. Cl.
  CPC ............ *G02B 13/004* (2013.01); *G02B 9/34* (2013.01); *G02B 9/62* (2013.01)

(58) Field of Classification Search
  CPC ................................................. G02B 13/0045
  See application file for complete search history.

(56) References Cited

U.S. PATENT DOCUMENTS 9,316,808 B1 *  4/2016  Hudyma ................ G02B 13/06
10,185,126 B2   1/2019  Kim et al.
2017/0227733 A1 8/2017  Lin et al.

FOREIGN PATENT DOCUMENTS

| TW | M537661   | U | 3/2017  |
| TW | 201730619 | A | 9/2017  |
| TW | 201734533 | A | 10/2017 |
| TW | 201802517 | A | 1/2018  |
| TW | 201930954 | A | 8/2019  |
| TW | I687737   | B | 3/2020  |
| TW | I690742   | B | 4/2020  |

OTHER PUBLICATIONS

First Office Action issued in corresponding TW application No. 109118104 dated Oct. 26, 2020 (11 pages).
Second Office Action issued in corresponding TW application No. 109118104 dated Mar. 26, 2021 (10 pages).

* cited by examiner

*Primary Examiner* — Joseph P Martinez
(74) *Attorney, Agent, or Firm* — MUNCY, GEISSLER, OLDS & LOWE, P.C.

(57) ABSTRACT

An optical lens includes a first lens, a second lens, a third lens, a fourth lens and a cemented lens. The first lens is closest to a magnified side as compared with any other lens of the optical lens, one of the second lens and the third lens is a first aspheric lens, and the fourth lens is a second aspheric lens and disposed between the cemented lens and a minified side of the optical lens. The optical lens satisfies the condition: 1.0<D1/DL<4.0, where D1 denotes a lens diameter of the first lens and DL denotes a lens diameter of the fourth lens.

19 Claims, 9 Drawing Sheets

OPTICAL LENS

BACKGROUND OF THE INVENTION a. Field of the Invention

The invention relates generally to an optical system, and more particularly to an optical lens.

b. Description of the Related Art

Recent advances in technology have led to the development of various types of optical lenses. For example, an image pick-up lens used in autonomous-vehicle cameras or machine vision judgment appliances is a commonly used optical lens. Nowadays, there is a growing need for the image pick-up lens to meet various requirements such as high optical performance. To meet these requirements, the optical lens needs to have, for example, low fabrication costs, high resolution, large effective aperture, low thermal drift and wide viewing angles. Therefore, it is desirable to provide an optical lens that may achieve lower fabrication costs, wider viewing angles, lower thermal drift and better imaging quality.

BRIEF SUMMARY OF THE INVENTION

According to one aspect of the present disclosure, an optical lens includes a first lens, a second lens, a third lens, a fourth lens and a cemented lens. The first lens is closest to a magnified side as compared with any other lens of the optical lens, one of the second lens and the third lens is a first aspheric lens, and the fourth lens is a second aspheric lens and disposed between the cemented lens and a minified side of the optical lens. An aperture stop is disposed between the second lens and the cemented lens, the cemented lens is disposed between the fourth lens and the aperture stop, a full field of view of the optical lens is in the range between 150 degrees and 180 degrees, a total number of lenses with refractive powers is no more than eight, and the optical lens has at most two plastic lens. The optical lens satisfies the condition: 1.0<D1/DL<4.0, where D1 denotes a lens diameter of the first lens and DL denotes a lens diameter of the fourth lens.

According to another aspect of the present disclosure, an optical lens includes a first lens group, a second lens group and an aperture stop. The first lens group includes two spherical lenses, and the second lens group includes a cemented lens and a first aspheric lens. The aperture stop is disposed between the first lens group and the second lens group, an F-number of the optical lens is smaller than or equal to 2.0, a full field of view of the optical lens is in the range between 150 degrees and 180 degrees, and a total number of lenses with refractive powers in the optical lens is no less than six and no more than eight. The optical lens includes at most two plastic lenses, and a displacement between a focal plane for 450 nm visible light and a focal plane for 550 nm visible light is smaller than or equal to 15 um.

According to another aspect of the present disclosure, an optical lens includes a first lens with a negative refractive power, a second lens with a negative refractive power, a third lens with a positive refractive power, a fourth lens with a positive refractive power, a fifth lens with a negative refractive power and a sixth lens with a positive refractive power arranged in order in a direction. The first lens, the second lens and the third lens is comprised of two glass spherical lens and an aspheric lens, the fourth lens and the fifth lens is combined to form a cement lens, and the sixth lens is an aspheric lens. The aperture stop is disposed between the second lens and the fourth lens, a total number of lenses with refractive powers in the optical lens is no more than eight, and the optical lens has at most two plastic lenses.

According to the above aspects, the optical lens may achieve good imaging quality, low thermal drift, low fabrication costs and wide viewing angles, and the optical lens is allowed to operate in a wide temperature range of −40° C. to 105° C.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a zoom lens may be applied to any system or environment according to actual demands.

In an imaging system, a magnified side may refer to one side of an optical path of an optical lens comparatively near a subject to be picked-up, and a minified side may refer to other side of the optical path comparatively near a photosensor.

Figure 1:
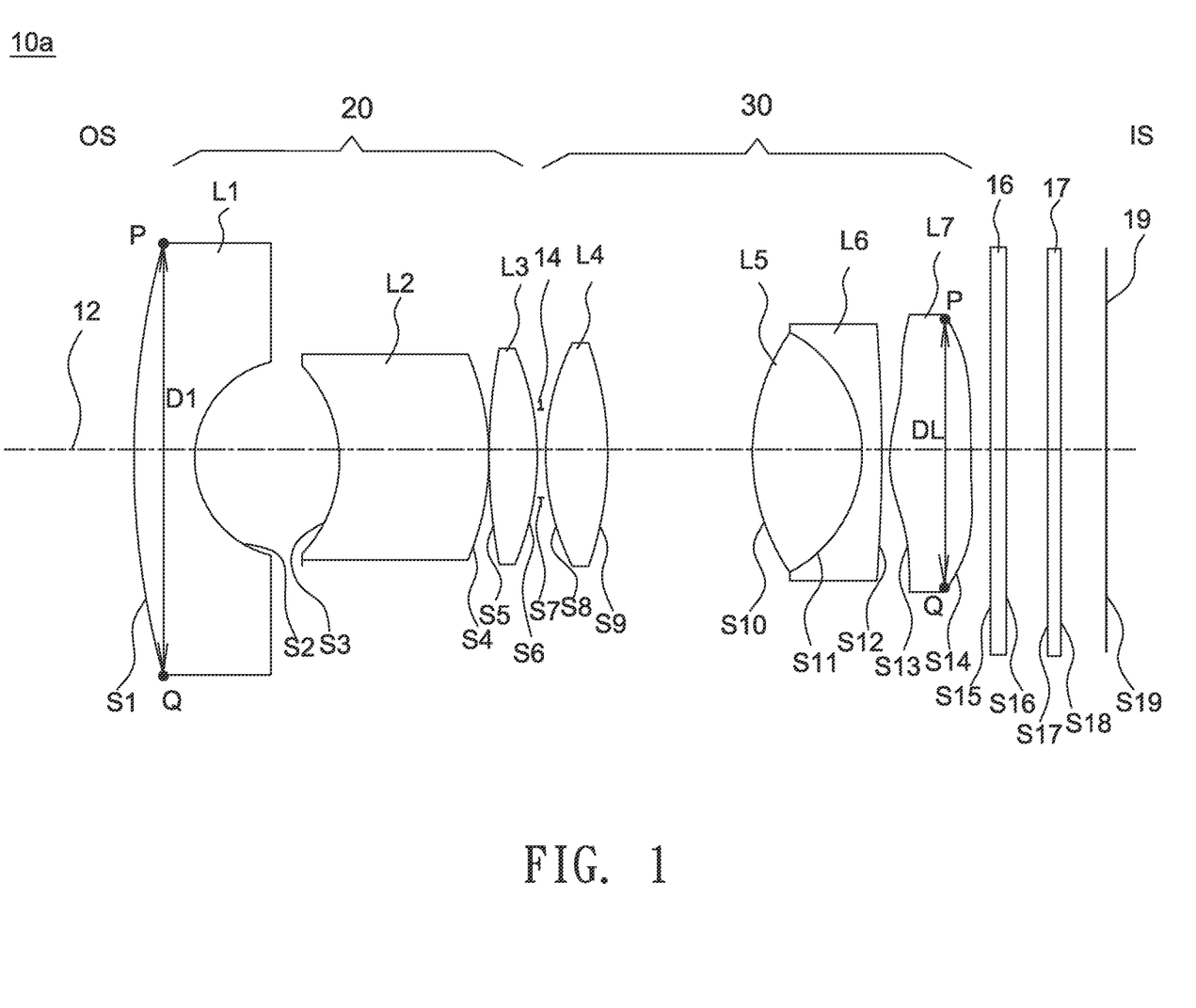
FIG. 1 shows a cross-sectional illustration of an optical lens according to a first embodiment of the invention.

A certain region of an object side surface (or an image side surface) of a lens may be convex or concave. Herein, a convex or concave region is more outwardly convex or inwardly concave in the direction of an optical axis as compared with other neighboring regions of the object/image side surface FIG. 1 shows a cross-sectional illustration of an optical lens according to a first embodiment of the invention. As shown in FIG. 1, in this embodiment, the optical lens 10a has a lens barrel (not shown), and inside the lens barrel a first lens L1, a second lens L2, a third lens L3, an aperture stop 14, a fourth lens L4, a fifth lens L5, a sixth lens L6 and a seventh lens L7 are arranged in order from a first side (magnified side OS or object side) to a second side (minified side IS or image side). In this embodiment, the first lens L1, the second lens L2, the third lens L3, the fourth lens L4, the fifth lens L5, the sixth lens L6 and the seventh lens L7 have negative, negative, positive, positive, positive, negative and positive refractive powers, respectively. The first lens L1, the second lens L2 and the third lens L3 form a first lens group 20 (such as a front lens group) with a negative refractive power, and the fourth lens L4, the fifth lens L5, the sixth lens L6 and the seventh lens L7 form a second lens group 30 (such as a rear lens group) with a positive refractive power. Further, the minified side IS is disposed with a light filter 16, a cover glass 17 and a photosensor (not shown), an image plane (visible-light focal plane) of the optical lens 10a formed at an effective focal length for visible light is labeled as 19, and the light filter 16 is disposed between the second lens group 30 and the image plane 19. In this embodiment, all lenses L1-L7 are glass lenses, and the third lens L3 and the seventh lens L7 are aspheric lenses. In other embodiment, at least one glass lens max be replaced with a plastic lens. Further, adjoining surfaces of each two adjacent lenses may have an identical radius of curvature or a similar radius of curvature (a radius difference smaller than 0.005 mm) to form a compound lens (such as a cemented lens, a doublet lens, a triplet lens or even higher number lens configurations). In this embodiment, the fifth lens L5 and the sixth lens L6 are fit together to form a cemented doublet, but the invention is not limited thereto. Further, in each of the following embodiments, the magnified side OS is located on the left side and the minified side IS is located on the right side of each figure, and thus this is not repeatedly described in the following for brevity.

The aperture stop 14 is an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

Each lens may be assigned a parameter of "lens diameter", and the "lens diameter" is defined by a distance between outermost turning points of the optical lens at each end of the optical axis 12. For example, as shown in FIG. 1, the magnified-side surface of the first lens L1 (the lens furthest from the aperture stop 14 among all lenses in the first lens group 20) has two opposite turning points P and Q (outermost turning points) that are spaced at a distance measured in a direction perpendicular to the optical axis 12, and such distance is referred to as a lens diameter D1 of the lens L1. Besides, the minified-side surface of the seventh lens L7 (the lens furthest from the aperture stop 14 among all lenses in the second lens group 30) has two opposite turning points P and Q (outermost turning points) that are spaced at a distance measured in a direction perpendicular to the optical axis 12, and such distance is referred to as a lens diameter DL of the seventh lens L7. In this embodiment, the first lens L1 (closest to the magnified side among all lenses of the optical lens) has a diameter D1 of 17.2 mm, and the seventh lens L7 (closest to the minified side among all lenses of the optical lens) has a diameter DL of 10.8 mm. It should be noted each value of the diameters D1 and DL described in this specification and claims is an actual measured value of a length between two opposite turning points of a lens surface, but not the value of a clear aperture (CA). It should be also noted values of the diameters D1 and DL or any ratio relative to the lens diameter (such as D1/DL) cannot be obtained by directly measuring the dimensions or proportion relationship from appended drawing, because these figures are only for schematic and explanatory purposes and may omit some portion and modify the actual profile of a lens.

A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis to correct abbreviations. Detailed optical data, design parameters and aspheric coefficients of the optical lens 10a are shown in Tables 1 and 2 below. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + \ldots$$

,where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

TABLE 1

D1 = 17.2 mm; DL = 10.8 mm; D1/DL = 1.6; F# = 1.63; D1/LT = 0.62

| Surface | Radius (mm) | Interval (mm) | Refractive index | Abbe number | Object description |
|---|---|---|---|---|---|
| 1 | 45.14 | 2.39 | 1.70 | 51.1 | meniscus (L1) |
| 2 | 4.76 | 5.05 | | | |
| 3 | −7.24 | 5.65 | 1.91 | 35.3 | meniscus (L2) |
| 4 | −14.62 | 0.10 | | | |
| 5* | 29.45 | 1.78 | 1.50 | 81.6 | aspheric (L3) |
| 6* | −16.84 | 0.10 | | | |
| 7 | inf. | 0.10 | | | aperture stop 14 |
| 8 | 11.79 | 2.23 | 1.50 | 81.6 | biconvex(L4) |
| 9 | −21.82 | 5.57 | | | |
| 10 | 10.65 | 4.06 | 1.50 | 81.6 | biconvex(L5) |
| 11 | −6.71 | 0.60 | 1.85 | 23.8 | meniscus (L6) |
| 12 | −250.00 | 0.54 | | | |
| 13* | 12.53 | 2.87 | 1.58 | 59.4 | aspheric (L7) |
| 14* | −250.00 | 0.84 | | | |
| 15 | inf. | 0.40 | 1.52 | 64.1 | light filter 16 |
| 16 | inf. | 1.80 | | | |
| 17 | inf. | 0.50 | 1.52 | 64.1 | cover glass 17 |
| 18 | inf. | 0.44 | | | |
| 19 | | | | | image plane 19 |

In the above Table 1, an interval of the surface S1 is a distance between the surface S1 and the surface S2 along the optical axis 12, an interval of the surface S2 is a distance between the surface S2 and the surface S3 along the optical axis 12, and an interval of the surface S18 is a distance between the surface S18 and the image plane 19 along the optical axis 12. Further, in the above table 1, LT denotes a total lens length that is a distance between an optical center of a magnified-side surface of the lens closest to the magnified side (such as the surface S1 of the first lens L1) and an optical center of a minified-side surface of the lens closest to the minified side (such as the surface S14 of the seventh lens L7).

Table 2 lists aspheric coefficients and conic constant of each aspheric surface of the optical lens 10a according to the first embodiment of the invention.

TABLE 2

| Surface | K | A | B | C | D | E |
|---------|---|---|---|---|---|---|
| S5 | 0.00E+00 | −1.74E−04 | −5.24E−07 | −2.79E−07 | — | — |
| S6 | −2.57E+00 | −1.19E−04 | 1.07E−06 | −2.76E−07 | — | — |
| S13 | −2.26E−01 | −6.94E−04 | −9.70E−06 | 2.55E−07 | −1.57E−08 | 4.45E−10 |
| S14 | 0.00E+00 | −4.89E−04 | −2.09E−05 | 8.41E−07 | −2.49E−08 | 4.14E−10 |

In the above table 1, the surface denoted by an asterisk is an aspheric surface, and a surface without the denotation of an asterisk is a spherical surface.

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in each table and shown in corresponding figures.

The Symbol F/# shown in the above table is an F-number When the optical lens is used in an image pick-up system, the image plane is a sensing surface of a photosensor. In one embodiment, an F-number of the optical lens is smaller than or equal to 2.0.

A full field of view is a light collection angle of the optical surface S1 closest to the magnified side and is measured diagonally. In one embodiment, the full field of view (FOV) is in the range between 150 degrees and 180 degrees. In another embodiment, the full field of view is in the range between 150 degrees and 175 degrees. In still another embodiment, the full field of view is in the range between 150 degrees and 170 degrees.

In one embodiment, the optical lens may include two lens groups, and the front lens group may include at least one lens with a negative refractive power to enhance light collection capability and achieve a wide field of view, but the invention is not limited thereto. In one embodiment, an F-number of the optical lens is substantially smaller than or equal to 2.0. The rear lens group may have at least one compound lens (such as a cemented lens, a doublet lens or a triplet lens) to correct chromatic aberrations, and a minimum distance between two lenses of a doublet lens along an optical axis is smaller than or equal to 0.01 mm. Adjoining surfaces of each two adjacent lenses of the doublet lens, triplet lens or even higher number lens configurations may have an identical or a similar radius of curvature. In one embodiment, a difference in Abbe number between two lenses of a cemented lens in the rear lens group is greater than 40 to correct chromatic aberrations; in other embodiment, such difference in Abbe number is greater than 50 to correct chromatic aberrations. Further, a total number of lenses with refractive powers in the optical lens is no more than eight, such as 6-8 in one embodiment. In one embodiment, each of the front lens group and the rear lens group has at least one aspheric lens to correct aberrations.

In one embodiment, the optical lens may include at most two plastic lenses. In one embodiment, at least two glass lenses with positive refractive powers having a negative refractive index variation as a function of temperature (dn/dt<0), where do denotes a variation in the refractive index of a lens at a temperature variation dt of the lens. The condition of dn/dt<0 for glass lenses can be realized by selecting a lens material with low dispersion and. high Abbe number (Vd>70). By matching the coefficients dn/dt for glass lenses in an optical lens, a thermal drift of the optical lens measured by a shift distance between a focal plane at 25 degrees and a focal plane at 105 degrees is smaller than or equal to 10 um. The optical lens according to various embodiments of the invention is allowed to operate in the range of −40° C. to 105° C. and enhance imaging quality, where a displacement between a focal plane for 450 nm visible light and a focal plane for 550 nm visible light is smaller than or equal to 15 um. In other embodiment, a displacement between a focal plane for 450 nm visible light and a focal plane for 550 nm visible light is smaller than or equal to 11 um.

In one embodiment, the optical lens may satisfy a condition of 1.0<D1/DL<4.0, a further condition of 1.05<D1/DL<3.9, and a still further condition of 1.1<D1/DL<3.8, where D1 is a lens diameter of the lens closest to the magnified side, and DL is a lens diameter of the lens closest to the minified side. Meeting the above conditions may facilitate light converging capability of lenses to reduce the scope of image beams passing through lenses to match the size of a photosensor and thus allow for better optical performance in a limited space.

Figure 4:
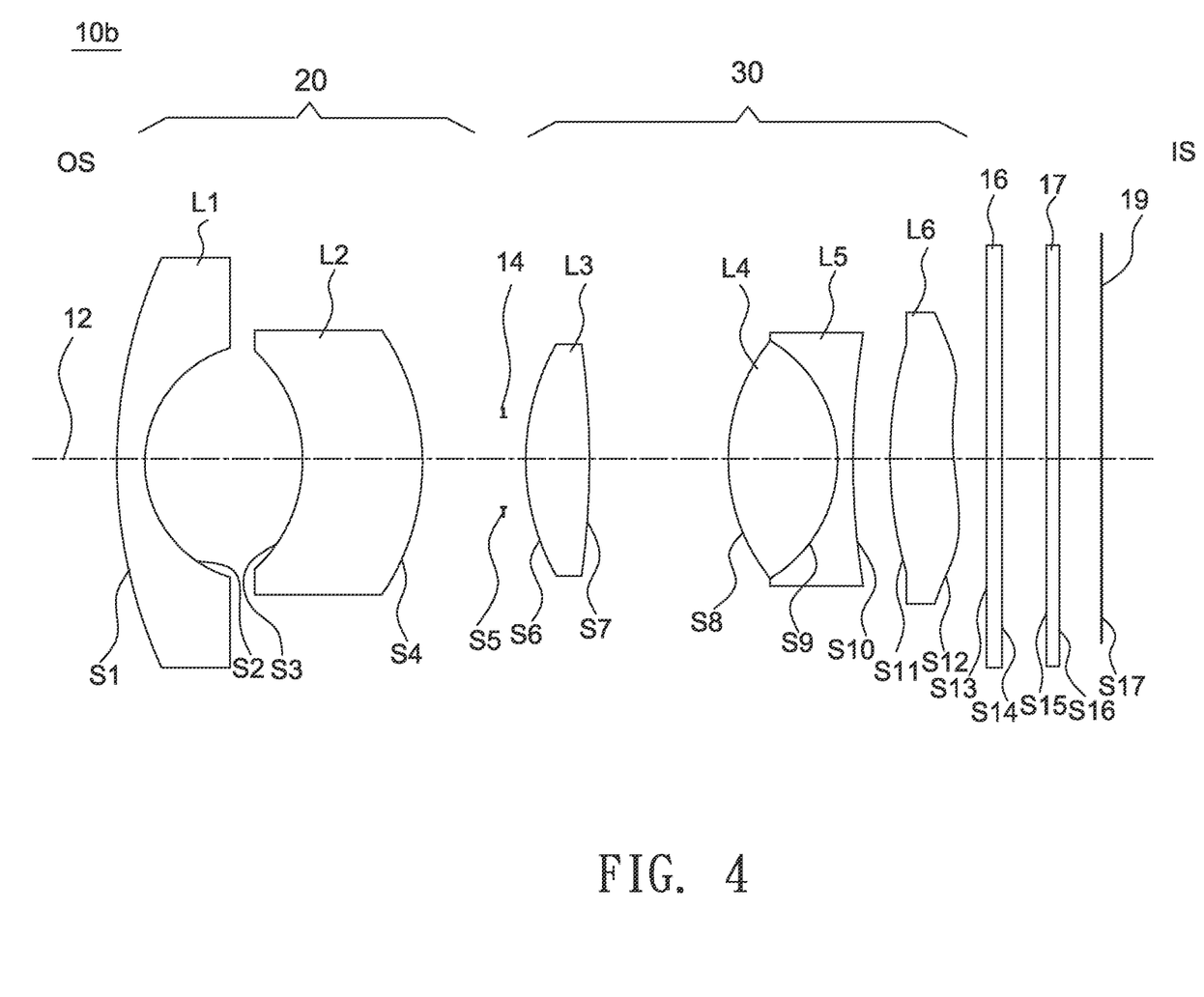
FIG. 4 shows a cross-sectional illustration of an optical lens according to a second embodiment of the invention.

FIG. 4 shows a cross-sectional illustration of an optical lens according to a second embodiment of the invention. As shown in FIG. 4, in this embodiment, the optical lens 10b includes a first lens L1, a second lens L2, an aperture stop 14, a third lens L3, a fourth lens L4, a fifth lens L5 and a sixth lens L6, the first lens L1 and the second lens L2 form a first lens group 20 with a negative refractive power, and the third lens L3, the fourth lens L4, the fifth lens L5 and the sixth lens L6 form a second lens group 30 with a positive refractive power. The first lens L1, the second lens L2, the third lens L3, the fourth lens L4, the fifth lens L5 and the sixth lens L6 have negative, negative, positive, positive, negative and positive refractive powers, respectively.

In this embodiment, all lenses L1-L6 are glass lenses. In other embodiment, at least one glass lens may be replaced with a plastic lens. In this embodiment, the third lens L3 and the sixth lens L6 are aspheric lenses, and the fourth lens L4 and the fifth lens L5 are fit together to form a cemented doublet, but the invention is not limited thereto. In this embodiment, the first lens L1 (closest to the magnified side among all lenses of the optical lens) has a diameter D1 of 15.5 mm, and the sixth lens L6 (closest to the minified side among all lenses of the optical lens) has a diameter DL of 10.7 mm. Detailed optical data, design parameters and aspheric coefficients of the optical lens 10b are shown in Table 3 below.

TABLE 3

D1 = 15.5 mm; DL = 10.7 mm; D1/DL = 1.4; F# = 1.64; D1/LT = 0.57

| Surface | Radius (mm) | Interval (mm) | Refractive index | Abbe number | Object description |
|---|---|---|---|---|---|
| 1 | 23.13 | 1.00 | 1.90 | 31.3 | meniscus (L1) |
| 2 | 5.33 | 5.69 | | | |
| 3 | −7.38 | 4.50 | 2.05 | 26.9 | meniscus (L2) |
| 4 | −10.48 | 3.59 | | | |
| 5 | inf. | 0.10 | | | aperture stop 14 |
| 6* | 9.49 | 2.21 | 1.69 | 53.1 | aspheric (L3) |
| 7* | −61.18 | 5.32 | | | |
| 8 | 9.50 | 4.01 | 1.62 | 63.4 | biconvex(L4) |
| 9 | −6.30 | 0.65 | 2.00 | 19.3 | biconcave(L5) |
| 10 | 47.98 | 1.24 | | | |
| 11* | 10.33 | 2.35 | 1.72 | 29.2 | aspheric (L6) |
| 12* | 110.00 | 1.20 | | | |
| 13 | inf. | 0.40 | 1.52 | 64.1 | light filter 16 |
| 14 | inf. | 1.80 | | | |
| 15 | inf. | 0.50 | 1.52 | 64.1 | cover glass 17 |
| 16 | inf. | 0.44 | | | |
| 17 | | | | | image plane 19 |

In the above Table 3, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 along the optical axis 12.

Table 4 lists aspheric coefficients and conic constant of each aspheric surface of the optical lens 10b according to the second embodiment of the invention.

TABLE 4

| Surface | K | A | B | C | D | E |
|---|---|---|---|---|---|---|
| S6 | −4.68E−01 | 4.65E−06 | 6.80E−07 | — | — | — |
| S7 | 0.00E+00 | 4.31E−05 | 4.41E−07 | — | — | — |
| S11 | 5.99E−01 | −8.27E−04 | −1.35E−06 | −5.17E−07 | 1.66E−09 | 3.04E−10 |
| S12 | 0.00E+00 | −4.00E−04 | −1.34E−05 | −6.40E−08 | 3.88E−10 | 1.62E−10 |

Figure 7:
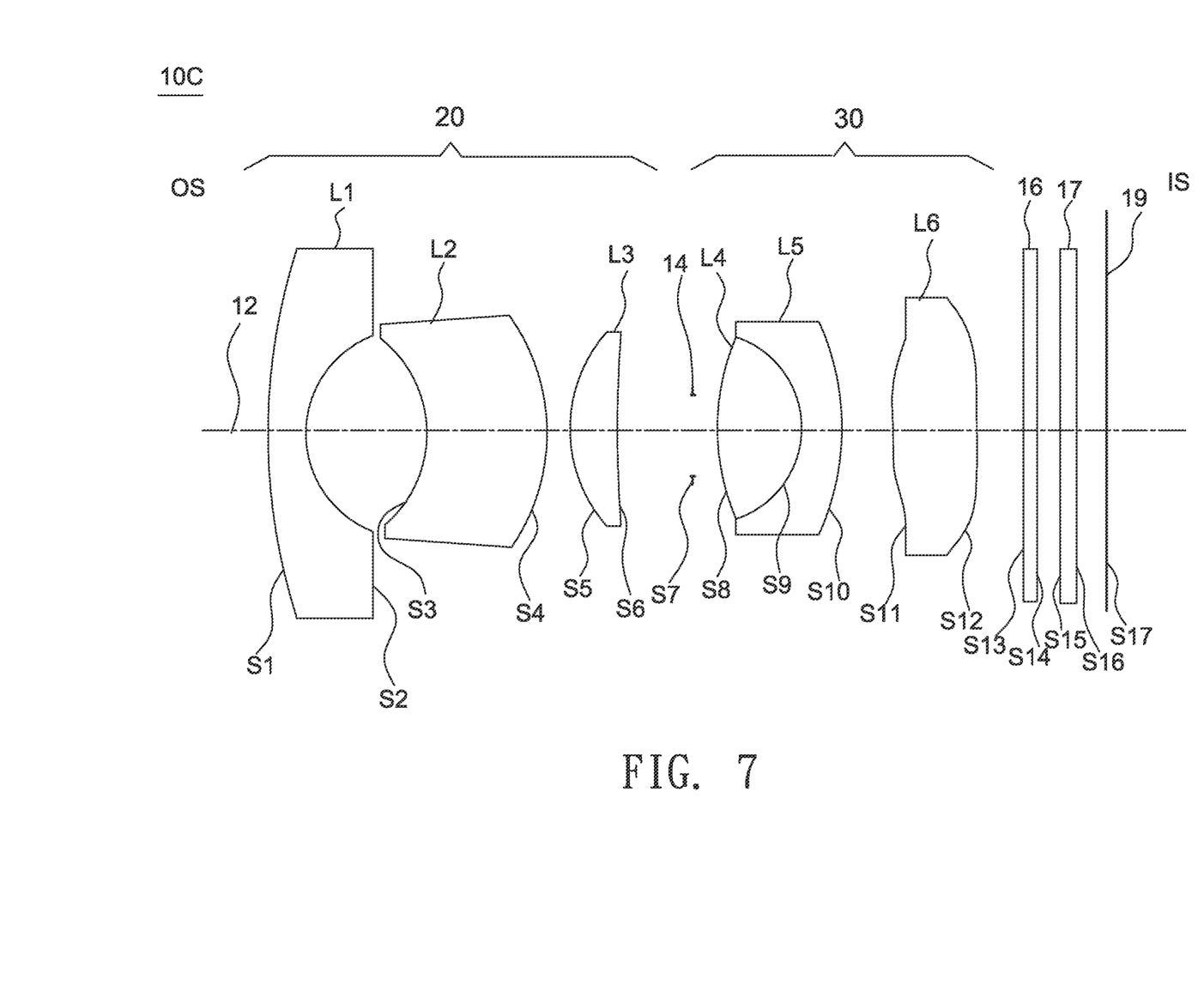
FIG. 7 shows a cross-sectional illustration of an optical lens according to a third embodiment of the invention.

FIG. 7 shows a cross-sectional illustration of an optical lens according to a third embodiment of the invention. As shown in FIG. 7, in this embodiment, the optical lens 10c includes a first lens L1, a second lens L2, a third lens L3, an aperture stop 14, a fourth lens L4, a fifth lens L5 and a sixth lens L6, the first lens L1, the second lens L2 and the third lens L3 form a first lens group 20 with a negative refractive power, and the fourth lens L4, the fifth lens L5 and the sixth lens L6 form a second lens group 30 with a positive refractive power. The first lens L1, the second lens L2, the third lens L3, the fourth lens L4, the fifth lens L5 and the sixth lens L6 have negative, negative, positive, positive, negative and positive refractive powers, respectively. In this embodiment, all lenses L1-L6 are glass lenses. In other embodiment, at least one glass lens may be replaced with a plastic lens. In this embodiment, the second lens L2 and the sixth lens L6 are aspheric lenses, and the fourth lens L4 and the fifth lens L5 are fit together to form a cemented doublet, but the invention is not limited thereto. In this embodiment, the first lens L1 (closest to the magnified side among all lenses of the optical lens) has a diameter D1 of 16.3 mm, and the sixth lens L6 (closest to the minified side among all lenses of the optical lens) has a diameter DL of 10.8 mm. Detailed optical data, design parameters and aspheric coefficients of the optical lens 10c are shown in Table 5 below.

TABLE 5

D1 = 16.3 mm; DL = 10.8 mm; D1/DL = 1.5; F# = 1.61; D1/LT = 0.60

| Surface | Radius (mm) | Interval (mm) | Refractive index | Abbe number | Object description |
|---|---|---|---|---|---|
| 1 | 31.14 | 1.42 | 1.77 | 49.6 | meniscus (L1) |
| 2 | 5.25 | 5.25 | | | |
| 3* | −6.02 | 5.22 | 1.74 | 49.3 | aspheric (L2) |
| 4* | −9.80 | 1.10 | | | |
| 5 | 8.62 | 2.11 | 1.74 | 44.8 | meniscus (L3) |
| 6 | 67.83 | 3.45 | | | |
| 7 | inf. | 0.62 | | | aperture stop 14 |
| 8 | 12.91 | 3.61 | 1.50 | 81.6 | biconvex(L4) |
| 9 | −5.08 | 1.76 | 1.81 | 22.7 | meniscus (L5) |
| 10 | −15.26 | 2.08 | | | |
| 11* | 10.78 | 3.72 | 1.50 | 81.6 | aspheric (L6) |
| 12* | 568.30 | 2.15 | | | |
| 13 | inf. | 0.40 | 1.52 | 64.1 | light filter 16 |
| 14 | inf. | 1.16 | | | |
| 15 | inf. | 0.50 | 1.52 | 64.1 | cover glass 17 |
| 16 | inf. | 0.44 | | | |
| 17 | | | | | image plane 19 |

In the above Table 5, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 along the optical axis 12.

Table 6 lists aspheric coefficients and conic constant of each aspheric surface of the optical lens 10c according to the third embodiment of the invention.

TABLE 6

| Surface | K | A | B | C | D | E | F | G |
|---|---|---|---|---|---|---|---|---|
| S3 | 0 | 6.49E−04 | −5.09E−07 | 1.61E−06 | −8.30E−08 | 1.85E−09 | 2.61E−11 | −1.07E−12 |
| S4 | 0 | 2.36E−04 | −2.30E−06 | 4.83E−07 | −2.86E−08 | 1.00E−09 | −1.80E−11 | 1.27E−13 |
| S11 | 0 | −6.37E−04 | −2.75E−05 | 3.27E−06 | −2.84E−07 | 1.32E−08 | −3.19E−10 | 3.20E−12 |
| S12 | 0 | −6.67E−04 | −2.82E−05 | 2.60E−06 | −1.77E−07 | 7.13E−09 | −1.52E−10 | 1.32E−12 |

Figure 2:
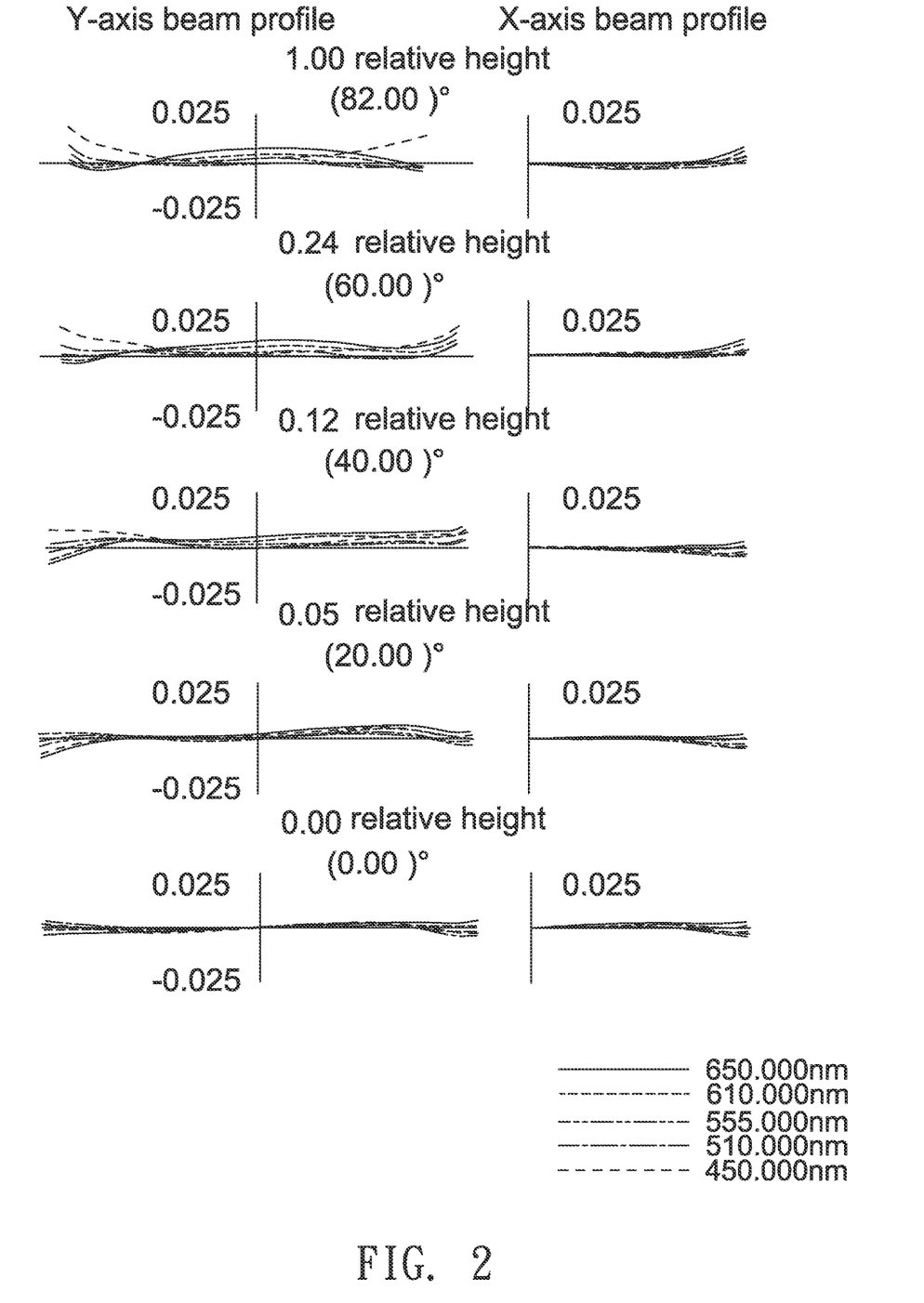
FIG. 2 shows a ray fan plot of the optical lens shown in FIG. 1.
Figure 3:
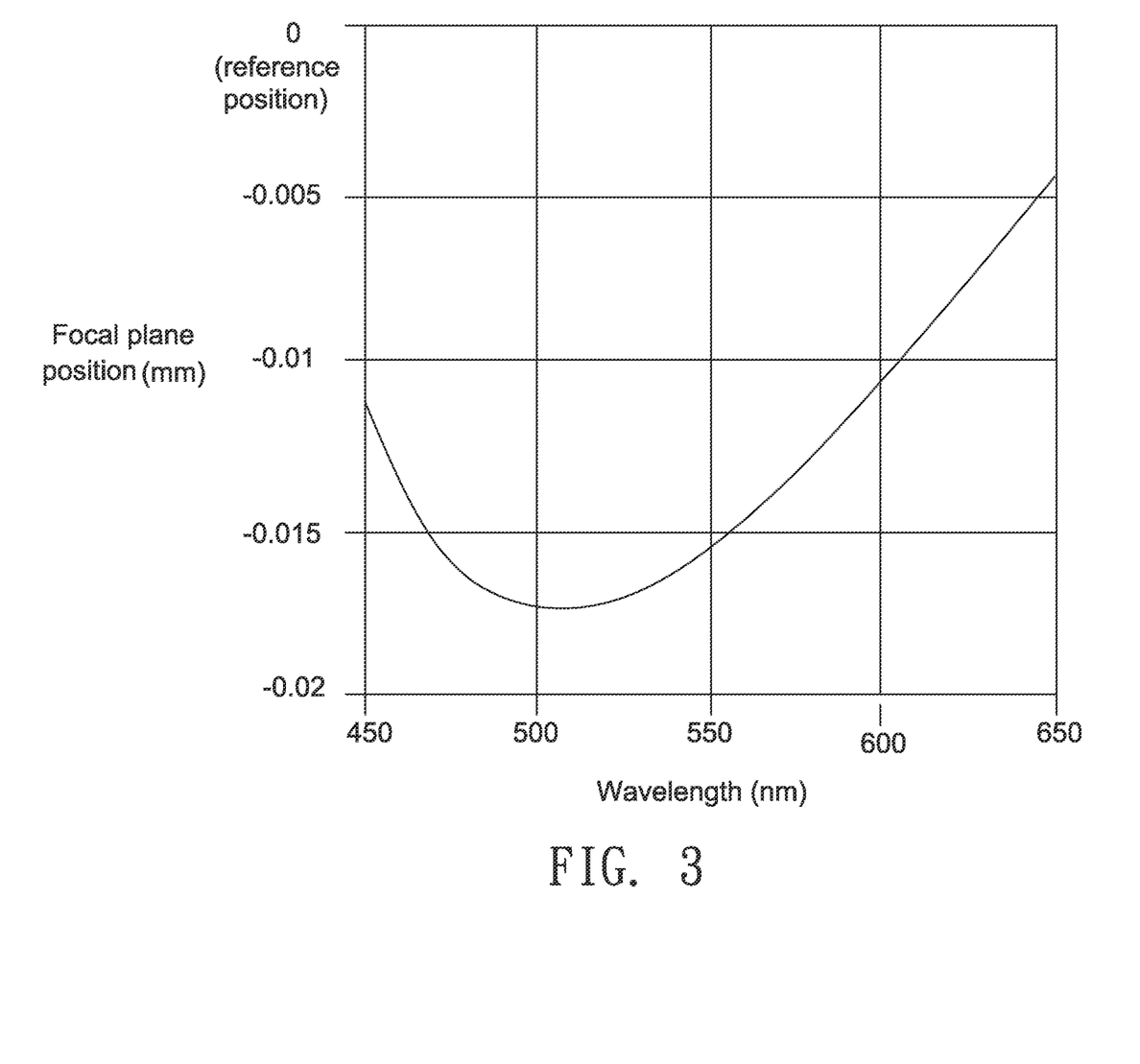
FIG. 3 shows a focus shift plot of the optical lens shown in FIG. 1.
Figure 5:
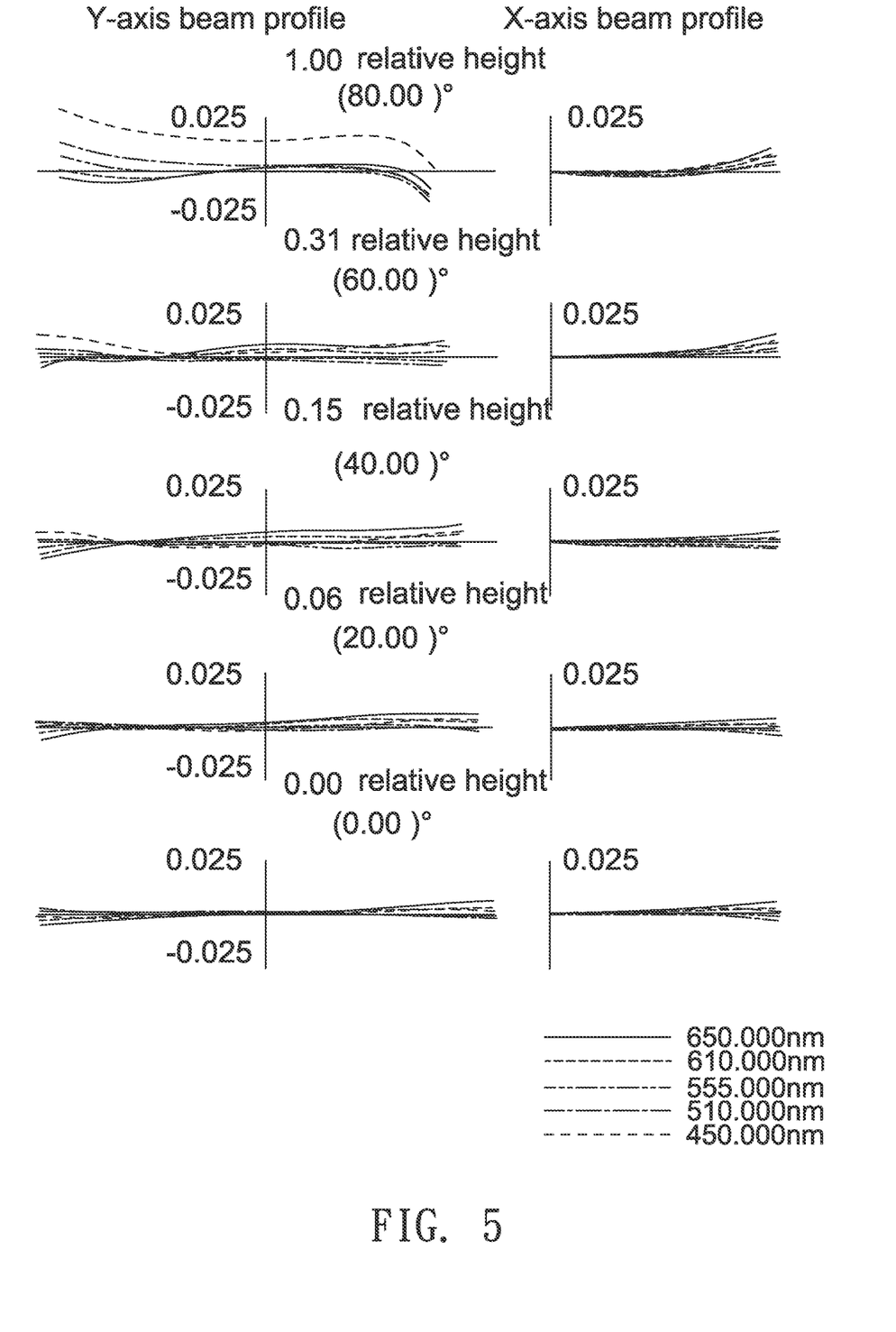
FIG. 5 shows a ray fan plot of the optical lens shown in FIG. 4.
Figure 6:
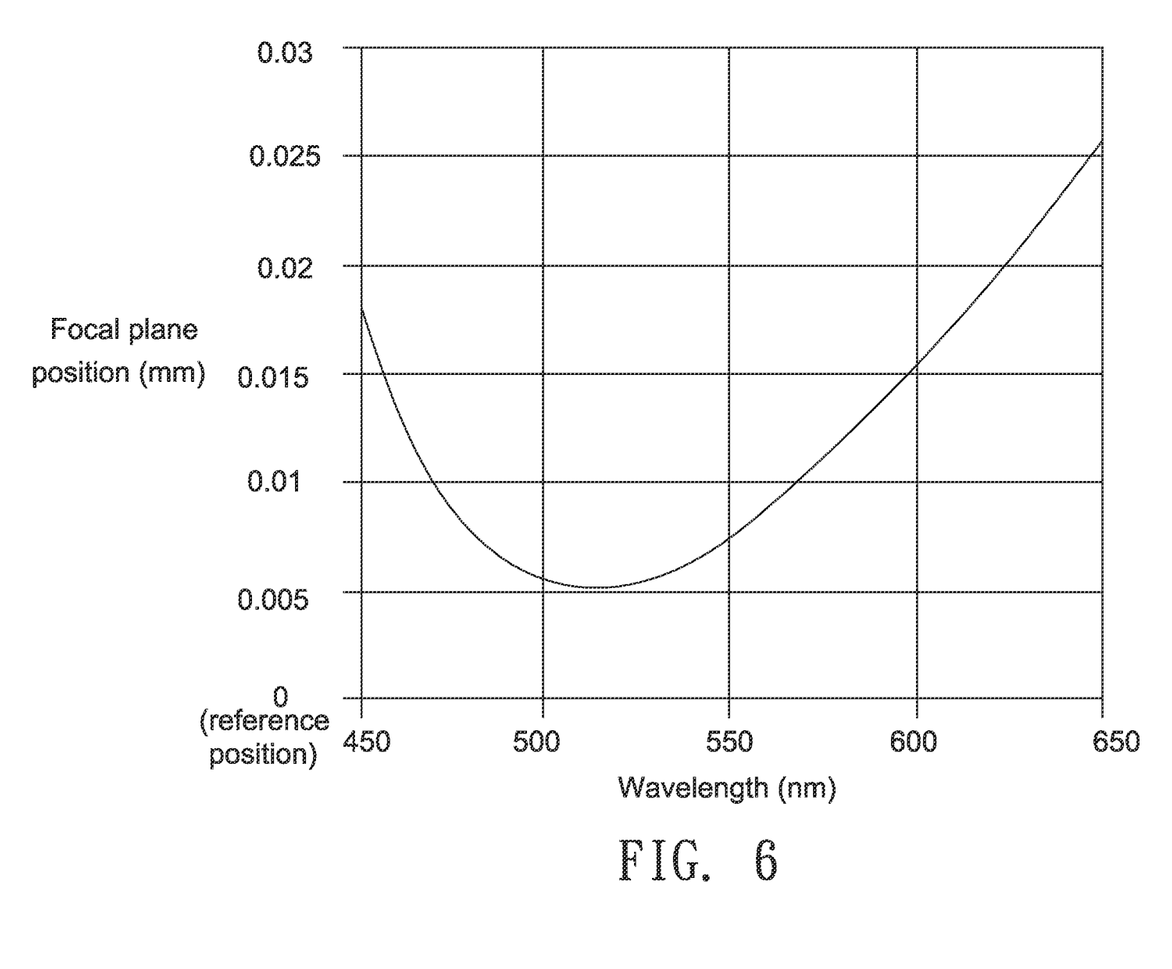
FIG. 6 shows a focus shift plot of the optical lens shown in FIG. 4.
Figure 8:
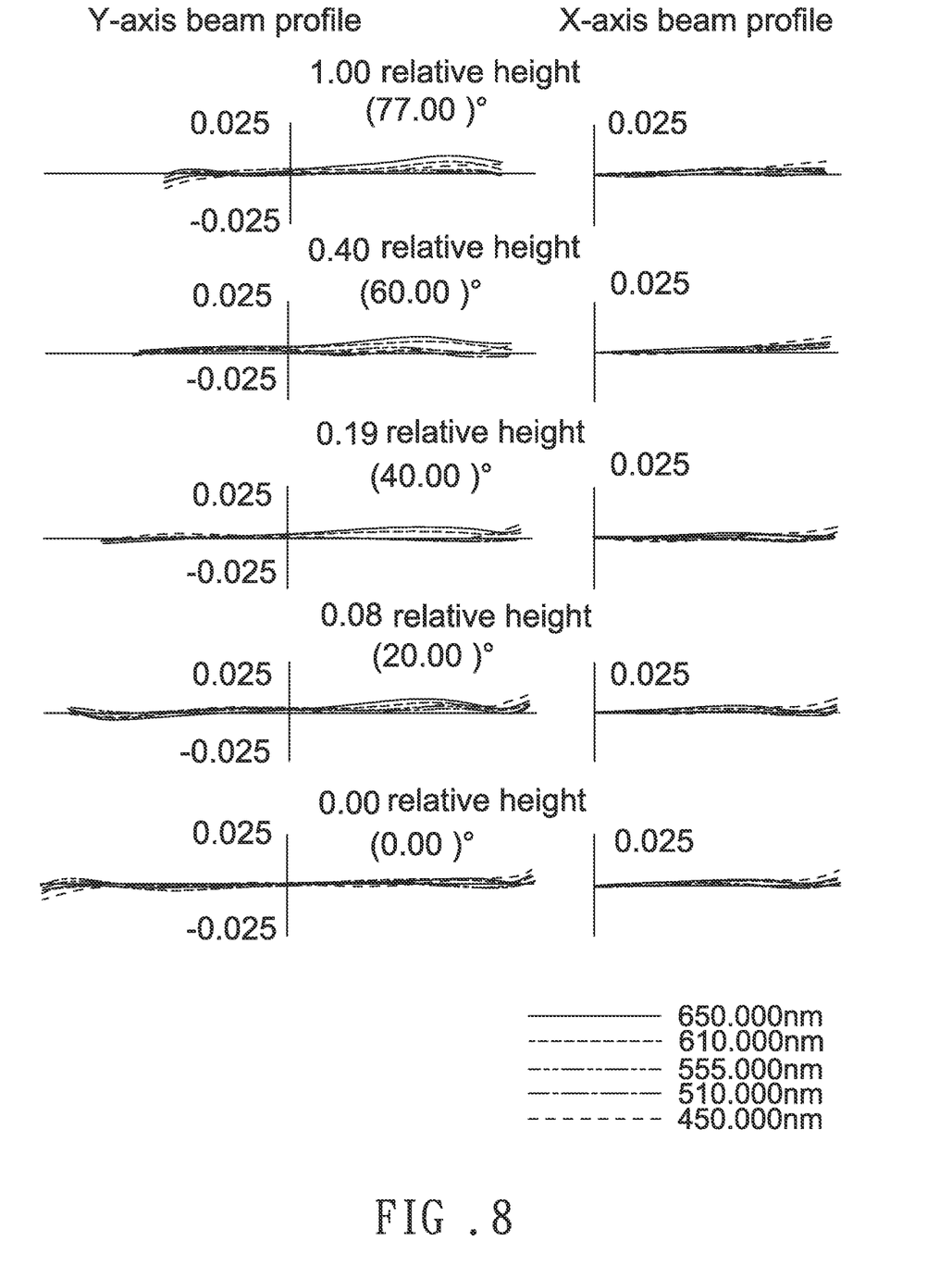
FIG. 8 shows a ray fan plot of the optical lens shown in FIG. 7.
Figure 9:
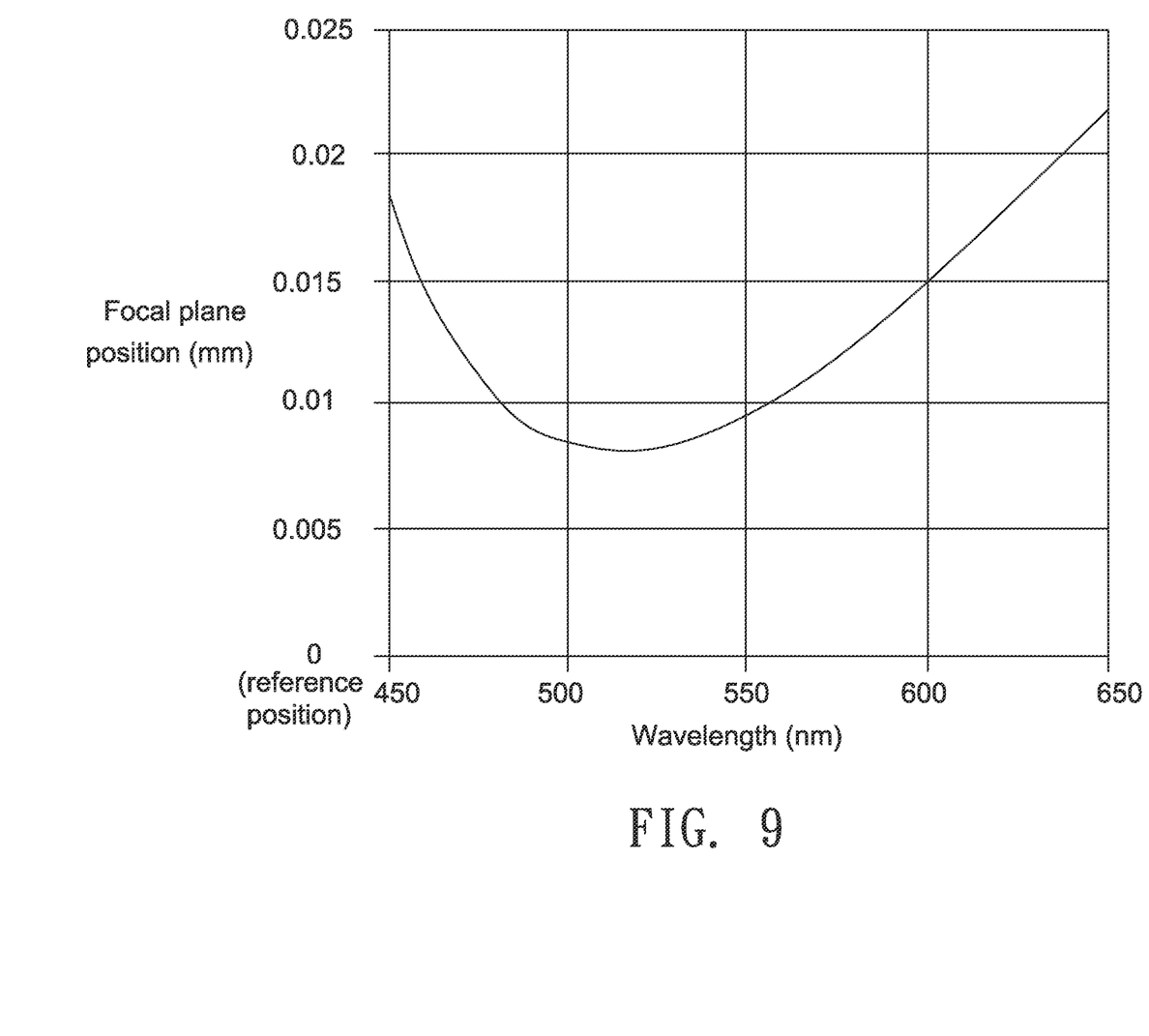
FIG. 9 shows a focus shift plot of the optical lens shown in FIG. 7.

FIGS. 2, 5 and 8 respectively show ray fan plots of the optical lens 10a, 10b and 10c. FIGS. 3, 6 and 9 respectively show focus shift plots for the optical lens 10a, 10b and 10c, where each curve shows displacements of a focal plane at different wavelengths relative to a reference focal position. The simulated results shown in FIGS. 2, 3, 5, 6, 8 and 9 are within permitted ranges specified by the standard, which indicates the above embodiment of the optical lens 10a-10c may achieve good imaging quality. Besides, FIGS. 3, 6 and 9 show a displacement between a focal plane for 450 nm visible light and a focal plane for 550 nm visible light is no more than 12 um.

According to the above embodiments, the optical lens may achieve good imaging quality, low thermal drift, low fabrication costs and wide viewing angles. Further, according to the above embodiments, the optical lens is allowed to operate in a wide temperature range of −40° C. to 105° C.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, two glass spherical lenses may be replaced with a plastic aspheric lens to reduce fabrication costs and number of lenses, or two spherical lenses may be replaced with an aspheric lens to reduce weight. Besides, the total number of lenses may be increased to enhance image resolution, or a single lens may be replaced with a cemented lens to correct chromatic aberrations. It is intended that the scope of the invention be defined by the claims appended hereto and their equivalents in which all terms are meant in their broadest reasonable sense unless otherwise indicated.

What is claimed is:

1. An optical lens, comprising:
a first lens, a second lens, a third lens, a fourth lens and a cemented lens, the first lens being closest to a magnified side of the optical lens, one of the second lens and the third lens being a first aspheric lens, and the fourth lens being a second aspheric lens and disposed between the cemented lens and a minified side of the optical lens; and
an aperture stop disposed between the second lens and the cemented lens, the cemented lens being disposed between the fourth lens and the aperture stop, a full field of view of the optical lens being in the range between 150 degrees and 180 degrees, a total number of lenses with refractive powers in the optical lens being no more than eight, a thermal drift of the optical lens measured by a shift distance between a focal plane at 25 degrees and a focal plane at 105 degrees being smaller than or equal to 10 um, the optical lens having at most two plastic lens, and the optical lens satisfying the condition:
1.0<D1/DL<4.0, where D1 denotes a lens diameter of the first lens and DL denotes a lens diameter of the fourth lens.

2. The optical lens as claimed in claim 1, wherein the first lens and the second lens are spherical lenses.

3. The optical lens as claimed in claim 1, wherein no lens with a refractive power is disposed between the aperture stop and the first aspheric lens.

4. The optical lens as claimed in claim 1, wherein a displacement between a focal plane for 450 nm visible light and a focal plane for 550 nm visible light is smaller than or equal to 15 um.

5. The optical lens as claimed in claim 1, wherein the optical lens satisfies one of the following conditions:
(1) the cemented lens is a cemented doublet;
(2) all lenses of the optical lens are glass lenses.

6. The optical lens as claimed in claim 1, wherein the optical lens has six lenses, and the six lenses of the optical lens have respective refractive powers of negative, negative, positive, positive, negative and positive in order from the magnified side to the minified side.

7. The optical lens as claimed in claim 1, wherein the optical lens has six lenses, and the six lenses of the optical lens have respective shapes of meniscus, meniscus, aspheric, biconvex, biconcave and aspheric in order from the magnified side to the minified side.

8. The optical lens as claimed in claim 1, wherein the optical lens satisfies one of the following conditions:
(1) a difference in Abbe number between two lenses of the cemented lens is greater than 40;
(2) a difference in Abbe number between two lenses of the cemented lens is greater than 50.

9. The optical lens as claimed in claim 1, wherein a full field of view of the optical lens is in the range between 150 degrees and 170 degrees.

10. The optical lens as claimed in claim 1, wherein an F-number of the optical lens being smaller than or equal to 2.

11. The optical lens as claimed in claim 1, wherein a total number of lenses with refractive powers in the optical lens ranges from 6 to 8.

12. The optical lens as claimed in claim 1, wherein the optical lens comprises at least one plastic lens.

13. The optical lens as claimed in claim 1, wherein the optical lens further comprises a fifth lens disposed between the third lens and the cemented lens.

14. The optical lens as claimed in claim 1, wherein the optical lens has seven lenses, and the seven lenses of the optical lens have respective refractive powers of negative, negative, positive, positive, positive, negative and positive in order from a magnified side to a minified side.

15. The optical lens as claimed in claim 1, wherein the optical lens has seven lenses, and the seven lenses of the optical lens have respective shapes of meniscus, meniscus, aspheric, biconvex, biconvex, meniscus and aspheric in order from a magnified side to a minified side.

16. The optical lens as claimed in claim 1, wherein the optical lens has six lenses, and the six lenses of the optical lens have respective shapes of meniscus, aspheric, meniscus, biconvex, meniscus and aspheric in order from a magnified side to a minified side.

17. The optical lens as claimed in claim 1, wherein the first lens has a negative refractive power, the second lens has a negative refractive power, the third lens has a positive refractive power, the fourth lens with a positive refractive power, and the cemented lens comprises a lens with a positive refractive power and a lens with a negative refractive power.

18. The optical lens as claimed in claim 17, wherein the optical lens satisfies one of the following conditions:
   (1) the cemented lens is a cemented doublet;
   (2) all lenses of the optical lens are glass lenses.

19. The optical lens as claimed in claim 17, wherein the optical lens comprises at least one plastic lens.

* * * * *